United States Patent [19]

Field et al.

[11] 4,410,911

[45] Oct. 18, 1983

[54] MULTIPLE SIGNAL TRANSMISSION METHOD AND SYSTEM, PARTICULARLY FOR TELEVISION

[75] Inventors: Robert W. Field, Fountain Valley; Ronald R. Gerlach, Mission Viejo; Clarence D. Perr, Brea; Robert S. Block, Marina Del Ray, all of Calif.

[73] Assignee: Telease, Inc., Los Angeles, Calif.

[21] Appl. No.: 398,376

[22] Filed: Jul. 14, 1982

[51] Int. Cl.³ .................... H04N 7/16; H04K 1/04
[52] U.S. Cl. ....................... 358/121; 179/1.5 S; 179/1.5 FS; 370/20; 455/28
[58] Field of Search ............ 358/121, 143, 144; 455/27, 28; 370/20; 179/1.5 S, 1.5 FS

[56] References Cited

U.S. PATENT DOCUMENTS

| | | | |
|---|---|---|---|
| 2,952,735 | 9/1960 | Weiss | 358/121 |
| 3,059,054 | 10/1962 | Reiter | 358/121 |
| 3,104,280 | 9/1963 | Akrell | 358/116 |
| 3,809,817 | 5/1974 | Gill et al. | 370/20 |
| 3,824,332 | 7/1974 | Horowitz | 358/121 |
| 3,936,594 | 2/1976 | Schubin et al. | 358/144 |

OTHER PUBLICATIONS

Numaguchi et al., NHK Lab Note, Ser. No. 132, Feb. 1970, pp. 2-29.

Primary Examiner—S. C. Buczinski
Attorney, Agent, or Firm—Burns, Doane, Swecker & Mathis

[57] ABSTRACT

A method and system for scrambling a plurality of input signals for secure transmission thereof, as well as various methods and systems for television transmission, are disclosed. The disclosed scrambling technique, in one form, includes modulating an in-phase component of at least one carrier signal in response to one and then another of a plurality of input signals in a sequence of time intervals such that parts but not all of the one and another of the input signals are carried by the in-phase component. A quadrature component of the at least one carrier signal is modulated in response to the one and another of the plurality of input signals in the sequence of time intervals such that parts but not all of the one and another of the input signals are carried by the quadrature component and such that the in-phase and quadrature components together carry the one and another of the input signals in their entireties. The modulated in-phase and quadrature components are combined for transmission. A decoder for unscrambling the plurality of signals is also disclosed. The various television transmission methods and systems involve provision of additional audio signals, in scrambled or unscrambled form, with the normal television audio and video signals so that multi-lingual program service as well as other services can be provided.

20 Claims, 10 Drawing Figures

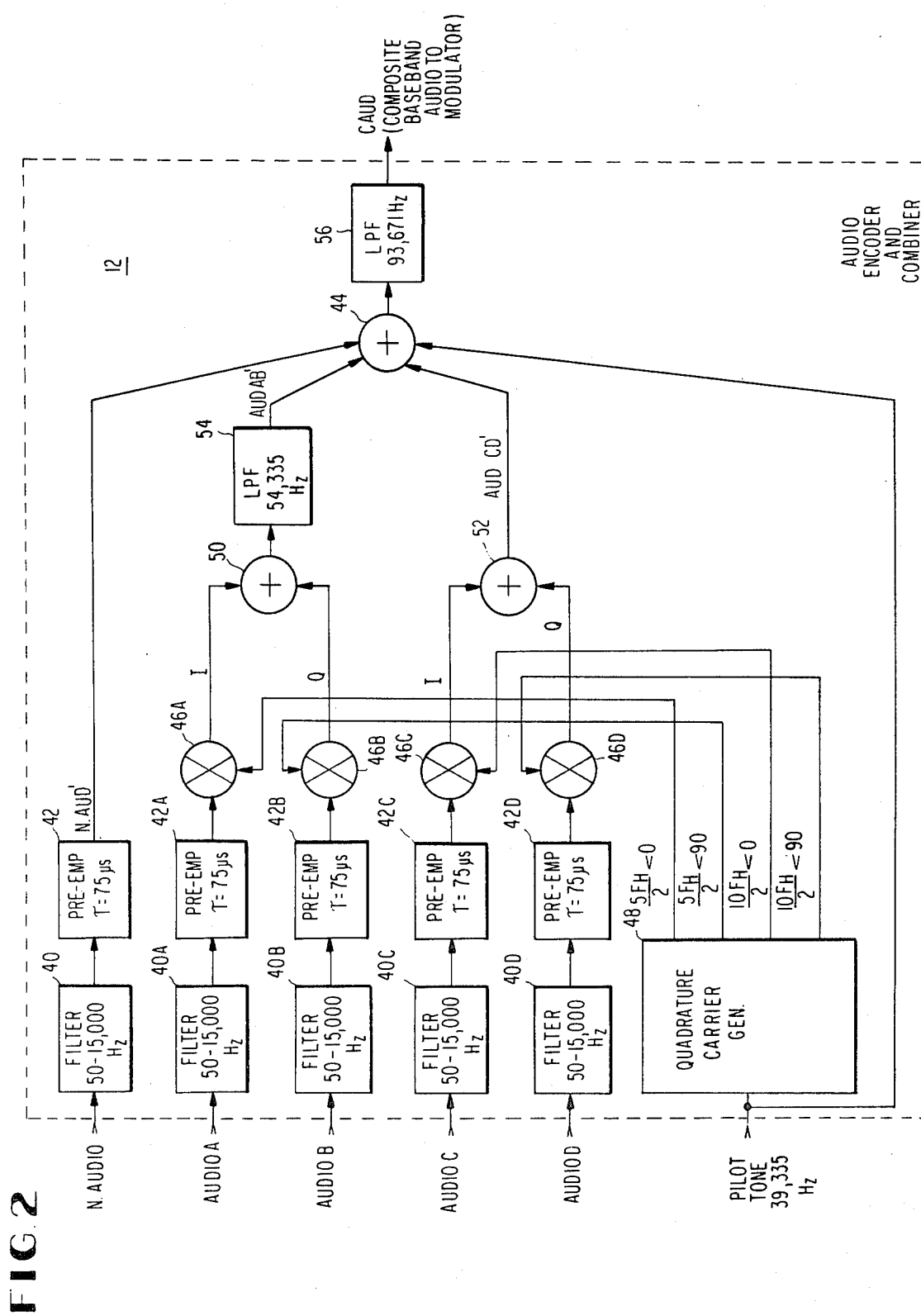

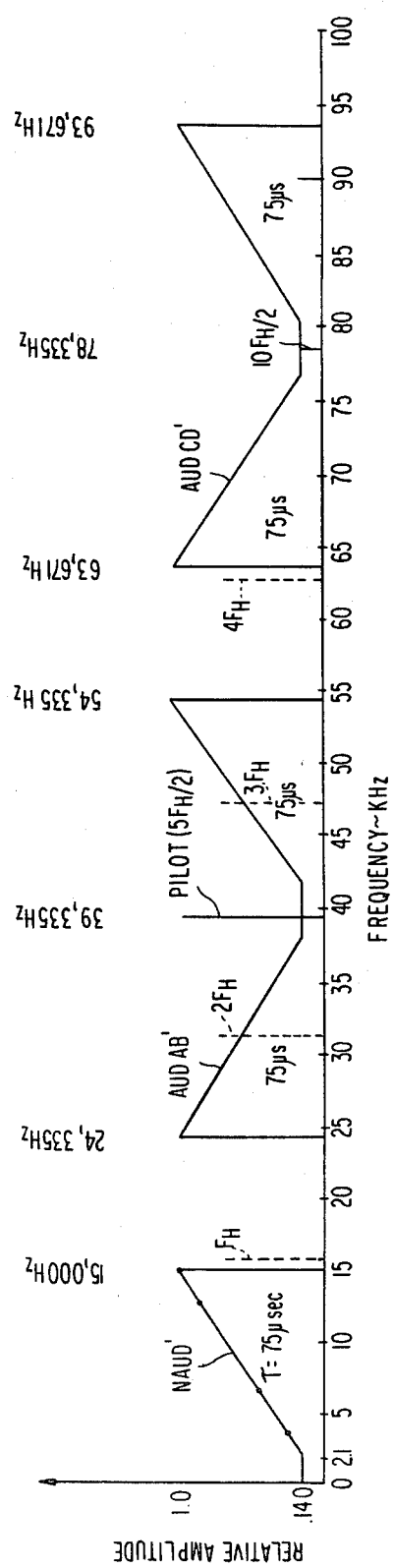
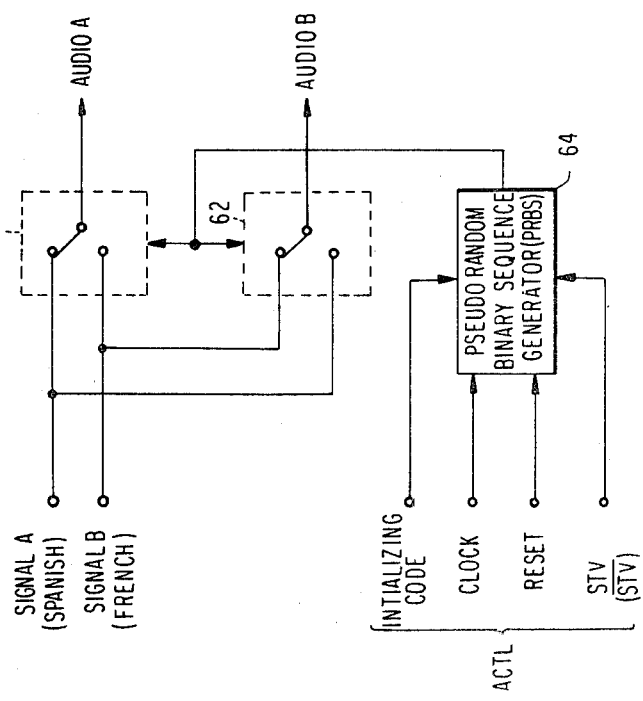

MULTIPLE SIGNAL TRANSMISSION METHOD AND SYSTEM, PARTICULARLY FOR TELEVISION

BACKGROUND OF THE INVENTION

The present invention relates to transmission and reception of audio and video signals and, more particularly, to a method and system for transmitting and receiving multiple audio frequency signals, preferably together with a video signal, within a frequency band allocated for a single television channel for commercial as well as subscription television, and to a multiple signal scrambling technique for secure transmission.

The transmission and reception of information in the frequency spectrum set aside for television has progressed to a point where viewers are provided with information of an audio or video nature in addition to the normal audio and video signals associated with a particular television program. Ordinarily, the normal television video signal is transmitted with an associated audio signal within an allocated frequency band of about 6 MHz. Recently, however, additional information has been transmitted and received by individual viewers with the normal audio and video signals, particularly in subscription television (STV).

Most STV systems, for example, include a video signal which is scrambled for certain subscription programs, an audio signal associated with the scrambled video signal, and an additional audio channel usually referred to as a barker channel. The barker channel is transmitted at the normal audio center frequency within the band allocated to a television channel. The barker is normally used for messages related to unscrambled video available to all viewers but unrelated to subscription television programs that are scrambled. The audio related to the scrambled subscription television programs is transmitted at a center frequency displaced from the normal audio center frequency and thus cannot be detected by the normal television receiver. Accordingly, a subscription television system may include a video signal at its normal location in the allocated frequency band (but scrambled) and two audio signals, one at the normal audio frequency position in the television channel frequency band and the other displaced from the normal television audio frequency location.

The normal television bandwidth allocated to a paticular channel also may be used to transmit additional information, related or unrelated to the television program video, where captions or other textual data is provided. For example, in captioning and teletext systems, information may be transmitted in the vertical interval of a normal television video signal or at some other convenient location in the signal. This additional information is broadcast in the normal television band allocated to a particular channel and is detected at the television receiver by a special adapter or decoder which then provides display of the captions or other textual material on the face of the television cathode ray tube (CRT).

Of course, other systems have been proposed in which additional information is transmitted, although not over the normal television frequency band allocated to a particular channel, in order to increase the amount of information available to a television viewer during the broadcast of a program. For example, television and FM stations often cooperate by simultaneously transmitting a television program over a normal allocated television channel and by transmitting its accompanying sound over an allocated FM radio channel. Thus, the viewer can watch a program on a normal television set while simultaneously listening to its accompanying sound in stereo using an FM receiver. A similar system has been proposed and has apparently been used to provide multi-lingual audio for a particular television program video. For example, in a system discussed in the July 1980 issue of TV World, at page 34, the ordinary television signal is apparently transmitted in the frequency band normally allocated to a television channel and an additional audio signal, in another language, is transmitted over an FM radio band. The viewer can select either the FM radio band or the normal television audio and thereby select, to accompany the program being viewed, either of two audios in different languages.

An objective of the present invention is also to provide information in addition to the normal television audio and video from which a television viewer can select. However, a primary objective is to provide such information within the normal frequency band allocated to a television channel. Moreover, an objective of the present invention is to provide a greater variety of information than has been heretofore available, without exceeding the allocated frequency bandwidth of a single television channel.

A further objective of the present invention is to provide information in addition to the normal television audio and video within a frequency band allocated to a single television channel in a manner that permits selection of a desired type of information by only those who are subscribers and thus eligible to receive that information.

It is therefore a more specific object of the present invention to provide a novel method and system for transmitting and receiving television signals within a normal frequency band allocated to a television channel wherein a television program video signal and at least three other signals are transmitted and can be selectively received.

Another object is to provide a novel scrambling and transmission technique for plural signals wherein the plural signals are transmitted in a minimum frequency bandwidth in a format secure from reception in an intelligible form by a normal receiver but are available on a selective basis to eligible individuals having decoders.

Yet a further object of the present invention is to provide a novel television transmission and reception method and system especially for subscription operation in which subscribers may select between a plurality of multilingual audio soundtracks accompanying the television video program material.

Still a further object of the present invention is to provide a subscription television system and method wherein highly secure transmission of the STV program material is effected by low level, relatively low security scrambling of the video portion of the television program and high level, highly secure scrambling of the audio portion of the program, and wherein one of a plurality of audio signals may be selected by eligible subscribers.

Briefly, one aspect of the present invention involves the scrambling of a plurality of input signals for secure transmission thereof of modulating in phase and quadrature components of at least one carrier signal with one and then another of the plurality of input signals in an alternating fashion such that neither that in phase nor the quadrature component contains the one or the other of the input signals in its entirety. More specifically, an in phase component of at least one carrier signal is modulated in response to one and then another of the plurality of input signals in a sequence of time intervals such that parts but not all of the one and another of the input signals are carried by the in phase component. A quadrature component of the at least one carrier signal is modulated in response to the one and another of the plurality of inputs signals in the same sequence of time intervals such that parts but not all of the one and another input signals are carried by the quadrature component and such that the in phase and quadrature components together carry the one and another of the input signals in their entireties. The modulated in phase and quadrature components are then combined for tranmission, for example, by summing the in phase and quadrature components and modulating a second carrier signal with the sum signal. The sequence of time intervals preferably comprises time intervals that vary in duration in a predetermined pseudo random manner. The input signals are preferably information signals with at least one information signal being an audio program signal associated with a television video program. In accordance with one embodiment, four input signals are scrambled by using the in phase and quadrature components of two carrier signals displaced in frequency by an amount sufficient to prevent interference in transmission. A subscriber to the scrambled transmission system may therefore choose between a number of available signals, including various language soundtracks accompanying a television video program.

In accordance with another aspect of the invention, normal audio and video program signals are transmitted in the respective normal audio and video signal frequency bands of an overall television frequency band allocated for transmission of a single television channel. The audio and video program signals are normal in the sense that they are transmitted at respective normal audio and normal video center frequencies assigned for transmission of the audio and video signals within the normal television audio and video frequency bands. Simultaneously with the transmission of the normal audio and video program signals, a plurality of additional audio signals (i.e., at least two) are transmitted in the normal audio frequency band, and within the overall television frequency band, at at least one center frequency displaced from the normal audio center frequency sufficiently so that there is no interference between the normal and additional audio signals in the transmission thereof. Moreover, the additional audio signals are transmitted in a manner that does not permit the transmitted energy to exceed the overall television frequency band.

Other aspects of the present invention include methods and systems for operating television systems with normal and additional audio signals either in scrambled or unscrambled forms for commercial television or STV services. Moreover, further features include billing and category selection (subscriber eligibility) methods and systems, as well as ways of providing eligibility and other codes, such as through addressing of individual decoders.

The foregoing and other objects and advantages of the present invention will become apparent to one skilled in the art to which the invention pertains from the following detailed description when read in conjunction with the appended drawings.

BRIEF DESCRIPTION OF THE DRAWINGS

FIG. 2 is a functional block diagram illustrating the audio encoder and combiner of FIG. 1 in greater detail;

FIG. 3 is a graphic illustration of the baseband audio spectrum produced in accordance with the embodiment of the invention illustrated in FIGS. 1-2; and FIG. 4 is a functional block diagram illustrating in detail one embodiment of an audio encoder or scrambles according to the present invention;

FIG. 5 is a graphic illustration of the scrambled audio signals produced by the encoder of FIG. 5;

DETAILED DESCRIPTION

A commercial broadcast television channel is normally allotted a frequency bandwidth of about 6 MHz within which the audio and video signals must be transmitted at assigned center frequencies. Most of that bandwidth is taken by the video signal with about 200–250 KHz at the upper end of the band remaining for the audio information. In accordance with the present invention as is functionally illustrated in FIG. 1 and described in detail hereinafter, the television video signal is modulated on a video carrier at a normal center frequency for the particular television channel. This video signal may or may not be scrambled but its location in the frequency band and its transmission may be entirely conventional. Accordingly, the video signal transmitted in accordance with the present invention may be received by the conventional television video receiver although, if it is scrambled or contains additional information, the video may be unpleasant or even impossible to view and the additional information will be lost without further signal processing at the viewer location.

Similarly, at least one audio signal is transmitted at the normal television audio carrier center frequency and can be received on a conventional television audio receiver. Because of its "normal" placement in the frequency band of the television channel, this audio signal is hereinafter referred to as the normal audio signal. As with the other "audio" signals discussed herein, the information content of the normal audio signal may vary from normal program audio or sound to information unrelated to the video. However, each "audio" signal referred to herein will be limited in frequency range to that of audio signals (e.g. from 20 to 20,000 Hz. and preferably from 50 to 15,000 Hz). Accordingly, the term audio signal in the context of the present invention may refer to any signal limited in frequency to the audio frequency range. Such signals may include audio information associated with a program video signal (e.g. the soundtrack of a film either monaural or stereo), additional audio information associated with video (e.g. one or more foreign language versions of a film soundtrack), and information unrelated to the program video signal (e.g. control signals, facsimile information, etc.)

As will be seen hereinafter, a plurality of audio signals other than the normal audio are provided in the composite television signal within the portion of the band allocated to audio transmission. These other audio signals are displaced in carrier frequency from the normal audio signal carrier frequency but the composite audio is within the 200–250 KHz band allotted for audio transmission in the frequency band of a single television channel.

Figure 1:
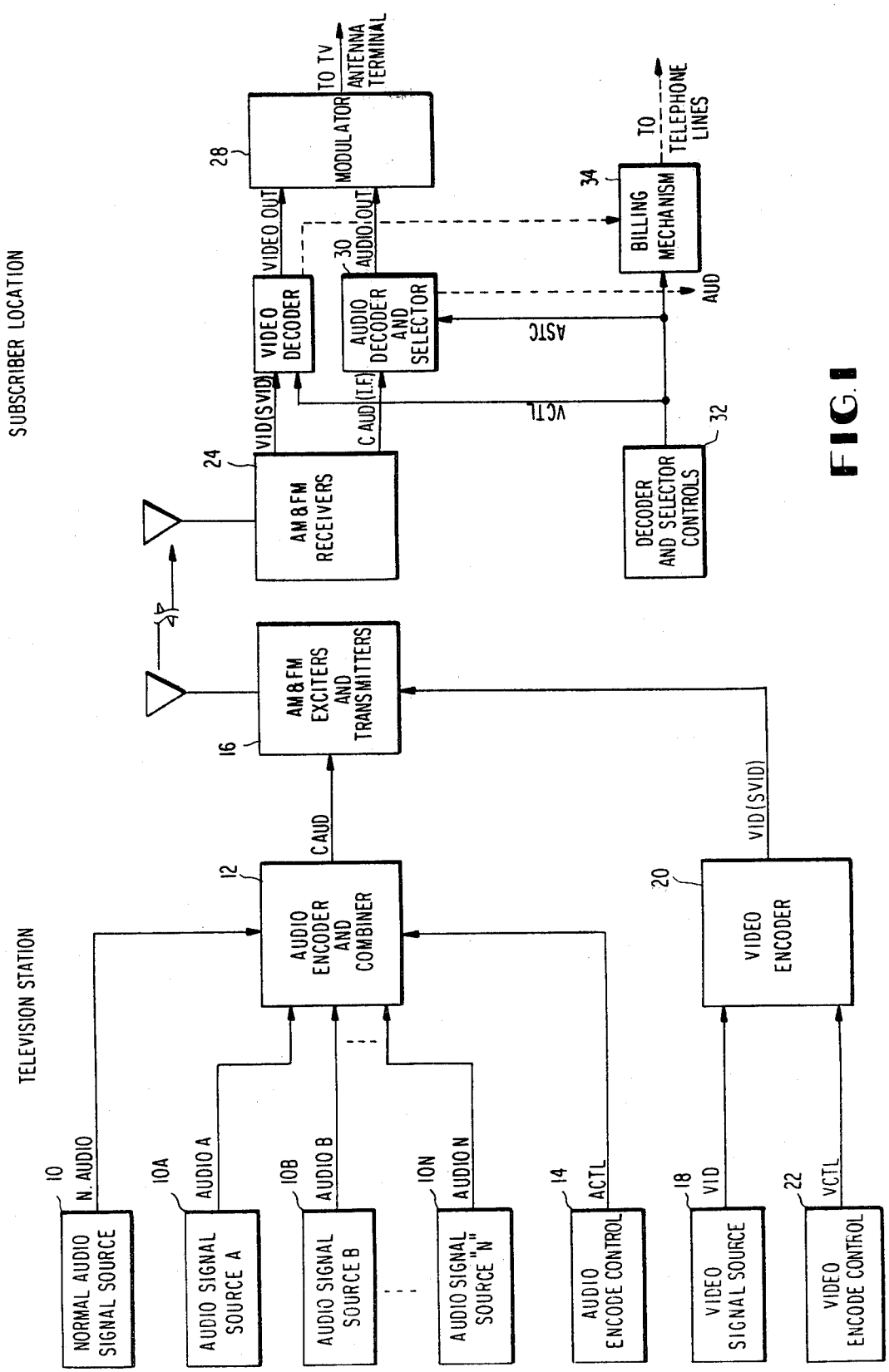
FIG. 1 is a functional block diagram generally illustrating one embodiment of a television transmitting and receiving system in accordance with the present invention.

FIG. 1 illustrates one embodiment of a system in accordance with the present invention wherein signals produced at a television station or some other central location are transmitted to a subscriber location (or a viewer location in the case of non-subscription services). Transmission from the television station to the subscriber location may be by over-the-air broadcast as illustrated or by other suitable conventional means such as cable. As will be appreciated, however, certain aspects of the present invention are equally applicable to any type of transmission while others, particularly the scrambling techniques and frequency spectrum conservation features described hereinafter, are more applicable to a broadcast system. Moreover, while the invention is described in connection with United States commercial television transmission standards, it should be understood that the principles of the present invention are applicable to various television signal transmission formats including those of other countries and those used in satellite or MDS transmission.

Referring now to FIG. 1, a normal audio signal source 10 provides a normal audio signal N.AUDIO to an audio encoder and combiner 12 described hereinafter in greater detail. Similarly, audio signal sources 10A, 10B, . . . 10N also provide audio signals AUDIO.A, AUDIO.B, . . . AUDIO. N. to the audio encoder and combiner 12. An audio control signal ACTL is provided to the audio encoder and combiner 12 from an audio encode control 14 described hereinafter in greater detail. A combined audio signal CAUD is supplied from the encoder and combiner 12 to conventional exciter (modulator) and transmitter circuits 16. In the usual television system, the audio signal is supplied to an FM exciter and transmitter since the audio signal is transmitted as a frequency modulated signal.

The video equipment at the television station includes a video signal source 18 which, in a subscription system having video scrambling of some program material, provides a video signal VID to a video encoder 20. In a scrambled video system, a video encode control circuit 22 provides a video control signal VCTL to the video encoder 20, and either an unscrambled or scrambled video signal VID or SVID is supplied from the video encoder 20 to the exciters and transmitter 16. For video signal transmission in the normal television system, the video signal VID (SVID) is supplied to AM exciter and transmitter since this information is transmitted in an amplitude modulated form. Of course, in a system without video scrambling as in a commercial TV system or a subscription service where the subscriber pays for only non-video services, a video encoder and encoder control circuit are not necessary.

At the viewer location, conventional AM and FM receivers receive and detect the respective video and audio signals transmitted from the television station. The AM receiver provides the VID (SVID) signal to a video decoder 26 which in turn provides the video output signal VIDEO OUT to conventional modulators 28 for remodulation at a particular television channel frequency. The FM receiver provides the combined audio signal CAUD to an audio decoder and selector 30 which in turn provides an audio output signal AUDIO OUT to the modulators 28. The combined audio and video modulator output signal is supplied to the television antenna terminals of a conventional television set.

The video and audio decoders are provided with various control signals as described hereinafter in greater detail by a decoder and selector control 32. In a subscription system, the signals from the decoder and selector controls 32 may also be provided to a suitable billing mechanism 34 of a suitable conventional design. In one such billing mechanism shown in U.S. Pat. No. 4,163,254, for example, billing information is accumulated in the billing mechanism 32 for periodic interrogation over telephone lines. As will be appreciated hereinafter, such a billing mechanism is readily adaptable for use in conjunction with the present system when particular information by a subscriber is to be paid for on the basis of selection and use of that information.

In operation, the normal audio signal and a plurality of additional audio signals are combined by the audio encoder and combiner 12 to form the composite audio signal CAUD under the control of the audio encode control signal ACTL. In a preferred embodiment of the invention, four audio signals in addition to the normal audio signal are combined to form the composite audio signal. It will be appreciated, however, that other numbers of audio signals in addition to the normal audio signal may be used to form the composite audio signal.

As will be seen hereinafter, the audio encoder and combiner 12 combines the multiple audio signals over a frequency baseband spectrum that is no greater than one-half of the bandwidth allocated to audio transmission in a normal television channel. In this manner, the overall bandwidth of the frequency modulated signal transmitted by the FM exciters and transmitter does not exceed this allocated bandwidth. Moreover, the various audio signals are provided within the baseband audio spectrum in forms that are readily distinguishable with relatively inexpensive hardware. For example, these audio signals are displaced in frequency from one another sufficiently that they can be separated by relatively inexpensive, conventional filtering techniques. Furthermore, it will be seen that by using in-phase and quadrature components of a single carrier to provide different forms of the audio signals, they may be readily distinguished and thus detected.

The video signal VID from the video signal source 18 is used to modulate a conventional AM exciter and transmmitter as any other standard television video signal would be used. However, as was previously explained it may be desirable to scramble the video signal prior to transmission and, thus, a video encoder may be provided for this purpose. The video encode control 22 may determine in any suitable manner whether or not the video encoder 20 scrambles the video signal and, in addition, the manner in which scrambling is accomplished. Of course, the encode control 22 may not be required if relatively simple scrambling such as suppresed sync or a.c. signal insertion techniques are used.

The composite television signal, i.e. the transmitted AM video and FM audio signals are received by respective AM and FM receivers in any suitable conventional manner to provide the composite audio signal and the video signal at desired intermediate frequencies. In the event that the video signal is scrambled (i.e. the SVID signal is transmitted and received), the video decoder 26 unscrambles the received video signal. Typically, depending upon the type of scrambling utilized, the video decoder 26 totally demodulates the video signal to provide the baseband video signal, reconstitutes the sync or polarity if sync or polarity scrambling is used, and then provides a reconstituted video output signal VIDEO OUT at baseband. This video output signal is then remodulated at a desired television channel frequency which may or may not correspond to the frequency band of the originally transmitted television signal. In fact, in accordance with one aspect of the present invention, the modulators for the audio and video output signals are fixed at a particular frequency corresponding to one television channel (e.g. channel 3) and the AM and FM receivers 24 include an all-channel tuner which permits all channels to be received and viewed on a television set without changing the channel selector on the set (see FIG. 10). To select a different television broadcast band, i.e. another television channel, the tuner on the AM and FM receiver 24 is changed to select the desired channel without the need for any change in the channel selector on the television set. In this manner, remote control and other features discussed hereinafter can be provided easily on existing television sets.

The composite or combined audio signal CAUD received by the FM receiver is supplied to the audio decoder and selector 30 and a single audio signal is selected as the audio output signal AUDIO OUT. Selection of the audio output signal is controlled by the viewer through the decoder and selector controls 32 described hereinafter in greater detail. Moreover, the decoder and selector controls 32 may provide for the selection of an additional one or more of the audio signals for application to an output jack or some equipment other than the normal television receiver. Selection of a particular audio signal or signals and/or acceptance of a scrambled video signal for unscrambling and viewing may be recorded by the billing mechanism 34 for billing purposes as was previously mentioned. In this regard, information contained in the video program signal such as a program identification may be supplied to the billing mechanism as illustrated in phantom in order to provide a complete record of the viewer's selection.

FIG. 2 illustrates one embodiment of the audio encoder and combiner 12 of FIG. 1 in which a normal audio signal N.AUDIO and four additional audio signals AUDIO A-AUDIO D are encoded and combined for transmission as the composite audio signal CAUD. In the FIG. 2 embodiment, the audio signals are not securely scrambled, although it will be seen that all the normal audio N. AUDIO will be displaced in the audio frequency band from the ordinary television audio center frequency so special equipment will be needed to detect the additional audios. It will also be seen hereinafter in connection with FIGS. 4-7 that, by addition of a scrambling circuit to the front end of the audio encoder and combiner, the additional audio signals may be securely scrambled so that even with equipment capable of receiving and detecting the additional audios, they cannot be utilized unless the suscriber equipment has appropriate unscrambling capabilities.

Referring now to FIG. 2, each of the normal and additional audio signals is filtered by an associated bandpass filter 40-40D. Each filter 40-40D is a conventional filter that limits the frequency range of the audio signals to between 50 and 15,000 Hz., a range well within the audio frequency range and yet sufficient to transmit high fidelity sound information.

The output signals from each filter 40-40D are applied to respective pre-emphasis circuits 42-42D. These pre-emphasis circuits are conventional circuits that have about a 75u second time constant at the frequencies involved. Accordingly, the lower frequency end of the audio signals is of a relatively constant amplitude to a frequency of about 2.1 KHz. At the 2.1 KHz. break point, the amplitude of the audio signal is "emphasized" and increases in a generally linear manner (see FIG. 3).

The output signal from the pre-emphasis circuit 42 is applied to a conventional summing or combining circuit 44 while the output signals from the pre-emphasis circuits 42A-42D are applied to respective mixers 46A-46D of a conventional type. For example, the mixers 46A-46D may be conventional double balanced mixers. The base band audio spectrum of each of the signals from the pre-emphasis circuits 42-42D are essentially alike and correspond to the generally illustrated portion of the spectrum designated NAUD' in FIG. 3.

The output signals from the mixers 46A-46D are the respective pre-emphasized audio signals double-sideband, suppressed-carrier, amplitude modulated (DSB-SC-AM) at one of two center frequencies and either in-phase (I) or 90° out-of-phase or in quadrature with a pilot tone. In this regard, a pilot tone of a desired frequency is applied to a conventional quadrature carrier generator 48 which generates an in-phase signal I and a quadrature signal Q at each of two distinct frequencies related to the pilot tone frequency. These I and Q signals at each of the selected frequencies are used as carriers in the DSB-SC-AM multiple audio approach set forth herein. The pilot tone is also applied to the summing circuit 44 for transmission as part of the composite audio.

The selected frequencies in the illustrated embodiment are related to the horizontal sync frequency $F_H$ of the television video signal since this frequency is convenient and also has multiples which are uniquely suited to the system of the present invention. Specifically, the frequency $5F_H/2$ (39.335 KHz.) is selected as one carrier frequency and the frequency $10F_H/2$ (78.67 KHz) is selected as the other. As will be seen hereinafter, this ensures about 10 KHz between each audio band in the composite base band audio spectrum and permits and transmission of five audio signals (using I and Q components) within the audio frequency bandwidth allotted in a television channel band.

With continued reference to FIG. 2, the in-phase carrier signal $5F_H/2$ (0°) is applied to the mixer 46A while the quadrature carrier at this same frequency $5F_H/2$ (90°) is applied to the mixer 46B. The in-phase carrier signal $10F_H/2$ (90°) is applied to the mixer 46D. The I and Q signals from the mixers 46A and 46B are combined by a conventional summing circuit 50 and the I and Q signals from the mixers 46C and 46D are applied to a similar summing circuit 52. The output signal from the summing circuit 50 is applied through a conventional low pass filter 54 to an input terminal of the summing circuit 44. The output signal from the summing circuit 52 is applied to another input terminal of the summing circuit 44 and the output signal from the summing circuit is applied through a conventional low pass filter 56 as the composite audio signal CAUD.

It will be appreciated that the signal from the combiner 50 is a composite of the AUDIO A and AUDIO B signals on the I and Q components of the carrier $5F_H/2$ (39.335 KHz). The highest desired frequency in this composite signal will be about 54.335 KHz since the composite audio will extend a maximum of 15 KHz on either side of the carrier (i.e. from 24.335 KHz to 54.335 KHz). Accordingly, the low pass filter 54 is designed to pass signals below 54.335 KHz and block (or at least substantially attenuate) all higher frequency signals. The result is a frequency spectrum generally indicated by the graph AUD AB' in FIG. 3 within the baseband audio frequency spectrum.

Similarly, the combiner 52 provides a composite of the audio signals AUDIO C and AUDIO D modulated on the I and Q components of the $10F_H/2$ carrier. The center frequency of this composite audio signal AUD CD' is at 78.67 KHz. and the composite extends from 63.67 KHz to 93.67 KHz. Accordingly, when this composite signal is combined with the composite signal AUD AB' and the pre-emphasized normal audio NAUD', the composite audio may be filtered to pass only signals at frequencies below the highest expected frequency of 93.67 (filter 56).

The resultant base band audio frequency spectrum of the composite audio CAUD is therefore the overall base band spectrum shown in FIG. 3. This audio spectrum will include the preemphasized normal audio signal (AUD N') in the base band frequency range 50 to 15,000 Hz. with a flat response between 50 and 2100 Hz. and an emphasized response thereafter. The additional audio signals are included in the spectrum in the I and Q phased, DSB-SC-AM signals centered about the pilot frequency and twice the pilot frequency. The pilot signal itself is provided as part of this composite spectrum and, as illustrated, the pre-emphasis of each additional audio signal appears as a flat response to 2100 Hz on either side of the center frequency and a rising slope thereafter.

The video horizontal frequency $F_H$ and its harmonics are shown in phantom in relation to the base band audio spectrum since they can pose interference problems. For example, AM-to-PM conversion can and does take place in the high power stages of the video AM transmitter. These PM sidebands exist at $f_H$, $2f_H$, and higher harmonies. When intercarrier detection is employed at the receiver, the PM sidebands around the video carrier are intermodulation to the 4.5 MHz intercarrier beat used for the FM detection. Upon FM detection the PM sidebands produce spurious tones in the detected audio signals. For standard broadcast system this presents no problem, since the spurious tones are at $F_H$(15,734 Hz.) and higher harmonics which lie outside the 15 KHz audio band. These spurious would appear as shown in phantom in FIG. 3. To eliminate them as a problem, it will be seen that the decoder according to the present invention does not employ an intercarrier detection, instead the audio intermediate frequency (I F), at 41.25 MHz, is shown-converted to 10.75 MHz, filtered, amplified, limited and then detected. Thus, there will be no significant intermodulation of the video carrier's PM onto the aural signal.

As was previously mentioned in connection with FIG. 1, the composite audio signal CAUD is applied to a conventional FM excited (modular) and transmitter for broadcast. Normally, the exciter/transmitter would include pre-emphasis that, with a single audio at the transmitter frequency, would result in the pre-emphasis shown in FIG. 3 for the NAUD' signal. However, in accordance with the present invention, a slightly different emphasis approach is taken. Initial pre-emphasis of the base band audio is accomplished as was previously discussed and, in lieu of the normal exciter pre-emphasis, the entire base band audio spectrum is pre-emphasized at a time constant that will result in a flat response to the base band audio from 50 to a break point of about 33,000 Hz (a break point well above the normal base band audio range transmitted in a television system) and an upwardly sloping, pre-emphasized response above the 33 KHz. break point. For the audio FM modulator or exciter of a broadcast television system in accordance with the illustrated embodiment, the pre-emphasis time constant in the exciter (again accomplished through conventional inductive loading or the like) will be modified so as to be on the order of 4.823 sec. to achieve this 33 KHz break point.

In addition, the FM exciter/transmitter in accordance with the present invention is preferably set for narrow-band operation at modulation frequencies above the 33 KHz break point with a fall-off to wideband operation at modulation frequencies significantly below 35 KHz. This may be accomplished in any suitable conventional manner by, for example, setting the transmitter modulation index for a deviation of about 18,734 Hz. when a tone at 93,671 Hz is applied at the proper level. With this wideband low frequency, narrow-band high frequency transmission approach, the bandwidth occupied by the modulated transmitter carrier will be about 189,102 Hz. (2[880+93,671]), a bandwidth well within the allocated 200-250 KHz bandwidth for the television audio signal.

Figure 6:
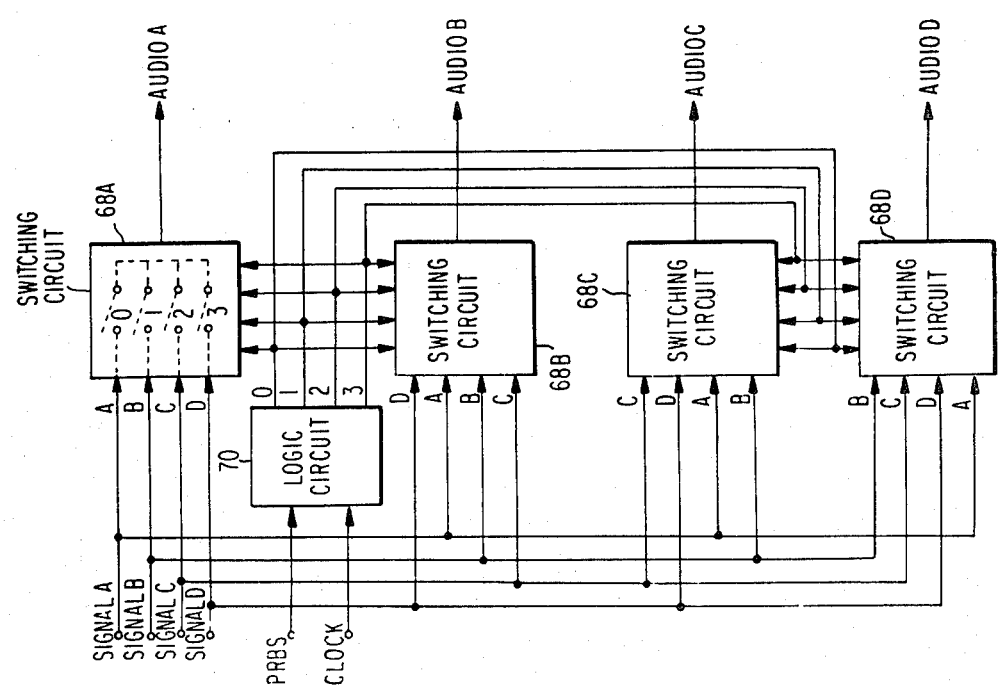
FIG. 6 is a functional block diagram illustrating another embodiment of an audio encoder or scrambler according to the present invention.

In accordance with the present invention, the additional audio signals may be scrambled so that only authorized or "eligible" subscribers can use the information available in the additional audio signals. One manner of scrambling the audio signals for secure transmission in the case of two additional audio signals is illustrated in FIGS. 4-6.

Referring to FIG. 4, a first information signal A such as as Spanish language aural signal associated with the video signal being transmitted is applied to one input terminal of a conventional electronic selector switch 60. Information signal A is also applied to an input terminal of an identical selector switch 62. However, if this signal A is applied to the normally closed (e.g. the normally conducting) side of the switch 60, then signal A is applied to the opposite or normally open (e.g. normally non-conductive) side of the switch 62. In this manner, the same control signal (e.g. a binary signal) applied to the switches 60 and 62 will cause signal A to appear at the output terminal of switch 60 and simultaneously block it from appearing at the output of switch 62, and vice versa, for any particular control signal level.

A second information signal B such as a French language version of signal A is provided at a second input terminal of the switch 60 and at the opposite input terminal of the switch 62. In this manner, the output signal at the output of switch 60 will be information signal B whenever the control signal is at one level and, at this same control signal level, the signal B will be blocked from the output terminal of switch 62, and signal A will appear at this terminal. It will thus be appreciated that, for any control signal, while signal A appears at the input of switch 60, signal B will appear at the output of switch 62. When the control signal changes, the opposite output signal conditions will exist.

A conventional pseudo random binary sequence (PRBS) signal generator 64 provides the control signal for the switches 60 and 62 as shown. In response to a clock signal, the PRBS generator provides output pulses having pulse widths that vary in accordance with a fixed, repeating pattern. However, the pattern has no discernable logical sequence and it repeats after a time period sufficiently long that the overall pattern appears to be random.

The PRBS generator signal pattern may be varied in accordance with an initializing code which is, in essence, loaded into the PRBS generator by a reset pulse RESET as illustrated. The reset pulse thus starts the PRBS generator at a point in a pseudo-random sequence that is determined by the initializing code, and the pseudo random sequence proceeds from that point in response to the CLOCK. As will be seen hereinafter, this permits the same pseudo-random pattern to be simultaneously generated at a remote location using an identical PRBS generator, clocked in phase with and at the same rate as the CLOCK signal and initialized by the same initializing code at the same reset time (relative to the timing of the audio received, of course).

The PRBS generator may also be enabled and disabled by the repective STV signals. The STV signal enables the PRBS generator to generate a pseudo-random sequence and thus scramble the signals A and B, and the STV signal disables the PRBS generator and eliminates scrambling.

It will be appreciated that if only two additional audio signals are provided as shown in FIG. 4, only the NAUD' and AUD AB' portions of the baseband audio spectrum need be utilized. Similarly, only the AUDIO A and AUDIO B channels of the encoder and combiner 12 of FIGS. 1 and 2 need be provided. Of course, it should also be noted that with only two additional audio signals, the AUDIO A and AUDIO C channels of the encoder and combiner 12 may be utilized and the two additional audios transmitted with only I modulation thereby additionally eliminating the combiners 50 and 52.

FIG. 5 graphically shows the timing and signal content AUDIO A and AUDIO B signals provided by the scrambler of FIG. 4 in relation to the control signal from the PRBS generator 64 in the scramble or STV mode. When a binary ONE signal level is provided by the PRBS generator, the AUDIO A signal contains the information signal B while the AUDIO B signal contains the information signal A. When the PRBS generator output signal switches to a binary ZERO level, the AUDIO A signal contains the information signal A and the AUDIO B signal contains the information signal B.

It can be seen that neither the AUDIO A nor the AUDIO B signal contains an entire information signal but, together they contain both information signals in their entireties. Since both the AUDIO A and AUDIO B signals are transmitted, a proper reversal of the scrambling process provides each information signal in its entirety and, with relatively simple filtering, without perceptible distortion. It will also be seen that proper reversal cannot be accomplished without the proper initializing code, the proper reset pulse and the proper clock signal (in addition to an audio receiver capable of receiving and detecting the additional audio transmissions). Scrambling is therefore extremely secure even with only two audio signals added to the normal audio.

Of course, when four additional audio signals are provided and scrambled, unauthorized unscrambling is practically impossible. For example, four information signals, SIGNAL A-SIGNAL D, may be applied to an encoder (scrambler) in accordance with the present invention as illustrated in FIG. 6. The illustrated encoder includes four switching circuits 68-A-D (e.g. a switch matrix) each connected in a conventional manner to select one of four input signals as an output signal. It will be appreciated that the switching circuits are controlled that, at any instant, each of the four information signals is selected as an output signal from only one switching circuit as in shown graphically in FIG. 7.

In FIG. 6, the switching circuits 68 receives the four additional information signals, SIGNAL A-D, and selects one as the output signal AUDIO A in resonse to control signals "0-3". The "0" control signal closes a switch "0" in the circuit 68A, connecting the first input terminaal to the output terminal and thereby causing SIGNAL A to be applied to the output as the AUDIO A signal. Similarly, the control signal "1" closes an associated switch "1" in the circuit 68A, connecting the second input terminal to the output thereby applying SIGNAL B to the output. Control signal "2" connects the third input terminal (SIGNAL C) to the output terminal and control signal "3" connects the fourth input terminal (SIGNAL D) to the output terminal.

The control signals "0-3" are generated in any suitable conventional manner in response to the PRBS signal from the PRBS generator of FIG. 4. For example, the PRBS signal and the CLOCK signal previously described in connection with FIG. 4 may be applied to a logic circuit 70 comprising conventional logic gates. The logic circuit produces the "0" control signal (e.g., the "0" control signal assumes a high signal level while the "1-3" signals remain low) in response to simultaneous binary ZERO logic levels in the PRBS and CLOCK signals. The "1" control signal is produced when the CLOCK signal is a binary ONE and the PRBS signal is a binary ZERO. The "2" control signal is produced when the CLOCK signal is a binary ZERO and the PRBS signal is a binary ONE, and the "3" control signal is produced when both the CLOCK and PRBS signals are binary ONE. In this regard, the logic circuit 70 operates like a conventional binary to decimal decoder.

Figure 7:
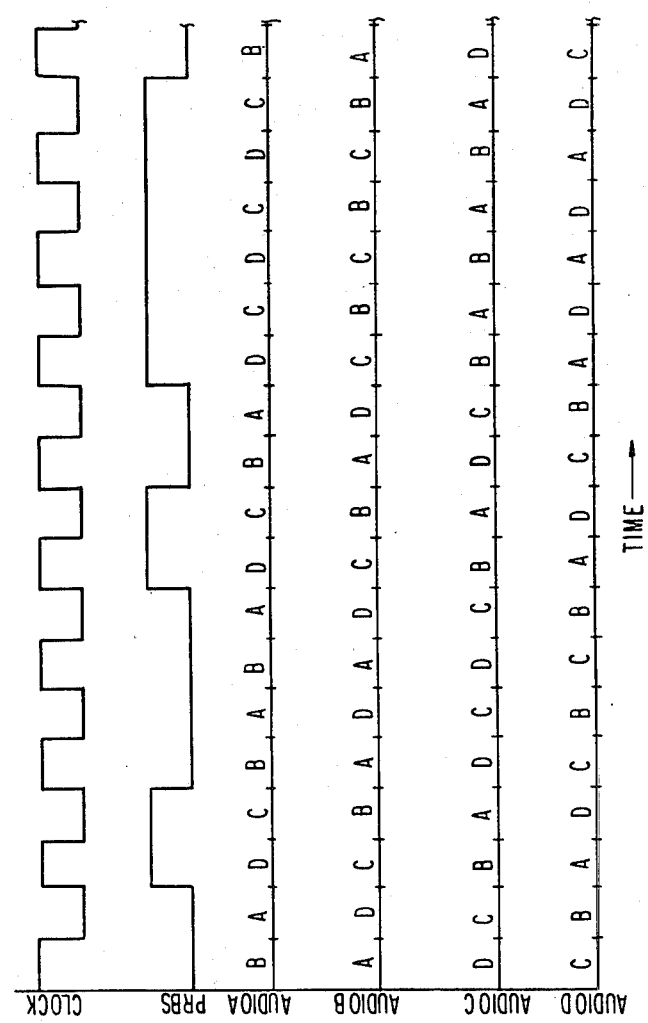
FIG. 7 is a graphic illustration of the scrambled audio signals produced by the encoder of FIG. 6.

The information signals, SIGNAL A-SIGNAL D, are also applied to the switching circuits 68B-68D, but different input terminals of each switching circuit. Thus, while each switching circuit 68A-68D is identical and makes the identical connections for a particular control signal, the output signal of each will be different for a particular control signal. As can be seen in FIG. 7, for example, when the CLOCK signal is high (binary ONE) and the PRBS signal is low (binary ZERO), the control signal "1" is generated and the respective B, A, D and C information signals are supplied as the AUDIO A, AUDIO B, AUDIO C and AUDIO D output signals. Each time the clock and/or the PRBS generator output signal changes, the information signal contained in the audio output signal changes in a seemingly random manner.

The encoder embodiment illustrated in FIG. 6 operates with equal time increments between audio signal content changes, rather than the pseudo-random increments produced in accordance with the two signal embodiment of FIG. 4. The encoding therefore resides in the pseudo-randomness of the audio signal content rather than in the timing. However, it should be noted that an additional element of security can be provided in the four signal embodiment by introducing pseudo-random time intervals between signal content changes as well as the illustrated pseudo-randomness of the content. This may be accomplished, for example, by employing a second pseudo-random bit sequence generator in place of the CLOCK signal as an input to the logic circuit 70 or in any other suitable manner.

Figure 8:
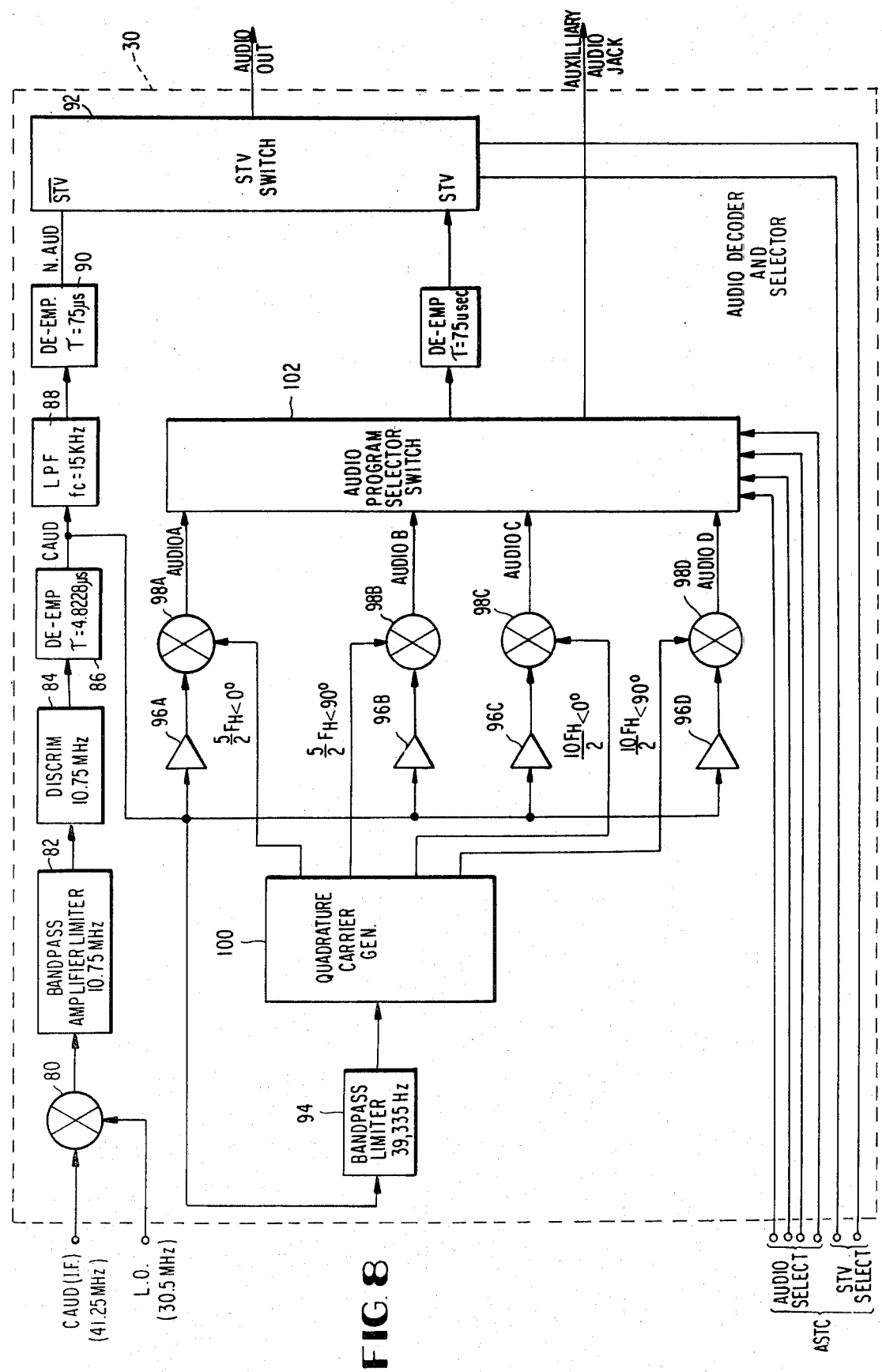
FIG. 8 is a functional block diagram illustrating the audio decoder and selector of FIG. 1 in greater detail.

FIG. 8 illustrates in greater detail one embodiment of the audio decoder and selector and controls 30, 32 at the subscriber location in the FIG. 1 embodiment. Referring to FIG. 8, the composite audio signal CAUD (I.F.) at the intermediate frequency of the FM receiver (indicated at 24 in FIG. 1) and as pre-emphasized by the FM exciter/transmitter at the television station is applied to a conventional double balanced mixer 80 together with a local oscillator signal L.O. The composite audio signal in the illustrated embodiment is at a 41.25 MHz. intermediate frequency and is mixed with a 30.5 MHz. local oscillator signal. This provides a composite audio at an intermediate frequency (I.F.) of 10.75 MHz (as well as other mixer products) at the output of the mixer 80.

The I.F. signal from the mixer 80 is applied to a conventional bandpass amplifier-limiter 82, and the output signal from the limiter 82 is applied to a conventional discriminator 84. The bandpass amplifier-limiter 82 and the discriminator 84 are designed for operation at the 10.75 MHz intermediate frequency. The composite audio at the 10.75 MHz I.F. is conventionally filtered, amplified and limited by the circuit 82 and the FM is conventionally detected by the discriminator 84 (e.g., by quadrature FM detection techniques). The resultant output signal from the discriminator 84 is thus the pre-emphasized composite audio signal. A conventional de-emphasis circuit 86 with a 4.8228u second time constant (33 KHz break point) to match that of the exciter/transmitter, de-emphasizes the composite audio signal to produce the composite audio CAUD that was provided at the output of the audio encoder and combines 12 of FIGS. 1 and 2.

The illustrated embodiment of the audio decoder and selector 30 of FIG. 8 is arranged to handle four audio signals in addition to the normal audio signal. The normal audio signal is detected in the composite audio CAUD simply by filtering through a low pass filter 88 wiith an upper cutoff frequency of 15 KHz. The signal from the filter 88 is the NAUD' signal of FIG. 3 and, after de-emphasis by a conventional de-emphasis circuit 90 having a 75 u second time constant (2.1 KHz break point), this signal is the normal audio signal NAUD with a flat frequency response. This NAUD signal is applied to one input terminal of a conventional two input terminal selector switch 92 designated STV switch in FIG. 8.

The composite audio signal CAUD is also applied to a bandpass limiter 94 to detect the 39.335 KHz pilot tone and to four identical audio channels each including a conventional bandpass amplifier 96 and a conventional double-balanced mixer 98. The amplifiers 96 and the mixers 98 ar labeled 96A–96D and 98A–98D, respectively, to designate the audio signal channels with which they are associated. Each of the bandpass amplifiers is designed with a lower cutoff frequency of about 24 KHz. and an upper cutoff frequency above the highest frequency of the composite audio in order to pass only the AUD AB' and AUD CD' signals (FIG. 3).

The pilot tone detected by the bandpass limiter 94 is applied to a conventional quadrature carrier generator 100 which generates the in-phase and quadrature carrier signals at the frequencies $5F_H/2$ and $10F_H/2$. The in-phase carier signal at the carrier frequency $5F_H/2$ from the generator 100 is applied to the mixer 98A while the quadrature signal at this frequency is applied to the mixer 98B. The in-phase quadrature carriers at the frequency $10F_H/Z$ are applied to the respective mixers 98C and 98D.

The output signals from the mixers 98A–98D are the respective baseband audio signals AUDIO A–AUDIO D as pre-emphasized by the respective circuits 42A–42D of FIG. 2. These signals may be appropriately filtered (not shown) to remove demodulation components above 15 KHz and applied to the input terminals of an audio program selector switch 102. The audio signal selected by the switch 102 is appropriately de-emphasized by a conventional de-emphasis circuit 104 having a time constant of 75 seconds. The selected audio output signal, after de-emphasis, is then applied to the STV input terminal of the switch 92 for selection as the audio output signal in STV mode.

In a system according to the invention wherein the additional audio signals are transmitted in an unscrambled form, the switch 102 may be a simple electronic or mechanical switching arrangement which merely selects a desired one of the four AUDIO signals. Further selection between the normal audio signal and the selected one of the additional audio signals may be accomplished in a similar manner by the switch 92 or by adding switch contacts to the switch 102. Moreover, one or more of the additional audio signals may be selected for application (or available at all times) at an output jack on the decoder. Thus, for example, a sound track transmitted in stereo may have one channel transmitted as the normal audio signal and the other as the AUDIO D signal, with the AUDIO D signal available at the auxilliary jack. Similarly, information to operate a piece of peripheral equipment may be provided at the auxilliary jack.

In an STV system, the normal audio signal will be an unscrambled signal as shown in the illustrated embodiment and will be selected as the audio output signal whenever the STV selection signal (e.g. an STV selector switch controlled by the subscriber) is in the "NON-STV" mode (STV). Ordinarily in STV operation, the normal audio signal is a barker signal and the video signal is scrambled. Until the video signal is accepted by the subscriber for unscrambling, however, a scrambled video will appear on the television display. When the subscriber selects the STV or unscrambling mode, the video signal is unscrambled and the selected one of the additional audio signals is provided as the audio output signal. Of course, it will be appreciated that this audio selection approach responsive to the STV signal may be used whether or not the additional audio signals are scrambled, but it is contemplated that they will be scrambled to add an extremely high level of security to the system.

In an STV system or other subscriber system where it is desirable to transmit the additional audio signals in a scrambled form (e.g. as shown in FIGS. 4-7), the audio program selector switch may include an unscrambling circuit controlled by the audio select signals. For example, the subscriber may insert the initializing code in his decoder and this code may be applied to a conventional PRBS generator identical to that at the transmitting station (see FIG. 4). Alternatively, this code may be transmitted to the subscriber location on a periodic basis over telephone lines as in U.S. Pat. No. 4,163,254 assigned to the assignee of this invention or by addressing each decoder and providing the code as part of the transmitted signal as is discussed hereinafter. The CLOCK and RESET signals required for the PRBS generator of FIG. 4 may be derived from the transmitted video signal or may be special codes inserted in this signal (e.g. in the vertical retrace interval).

Figure 9:
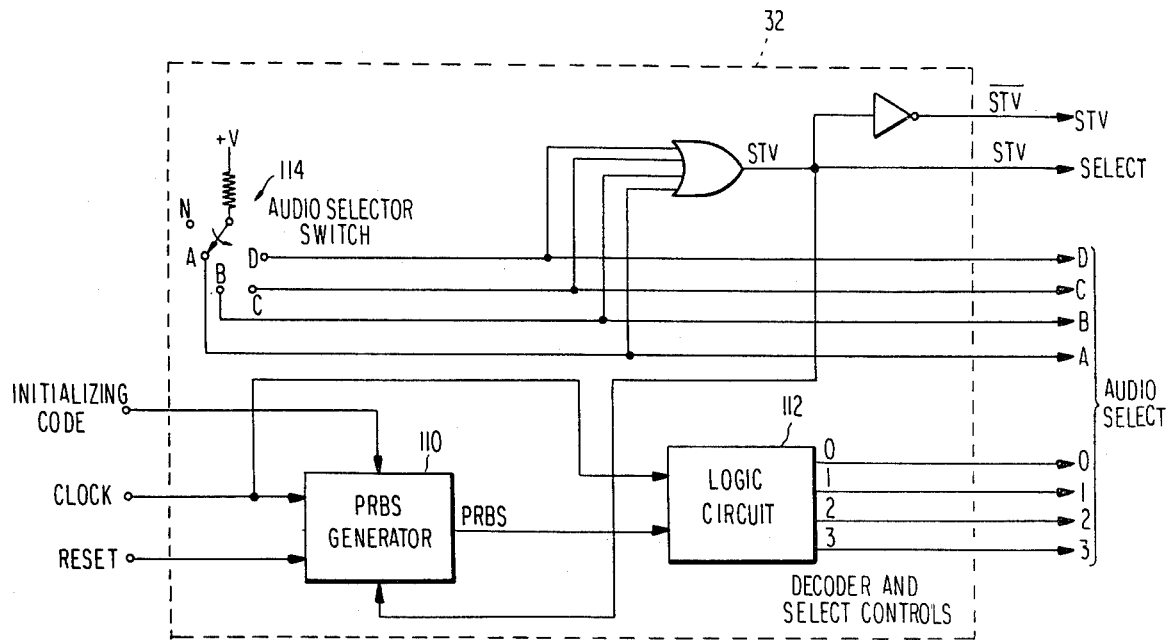
FIG. 9 is a functional block diagram illustrating in greater detail one embodiment of the decoder and selection controls of FIG. 1; and, FIG. 10 is a functional block diagram of one embodiment of a receiver turning arrangement and category code storage arrangement according to the present invention.

Accordingly, a PRBS generator synchronized with the PRBS generator at the transmitter site is provided in the decoder. For example, the decoder and selector control 32 of FIG. 1 may include such a PRBS generator 110 as shown in FIG. 9. The PRBS signal may be applied to a logic circuit 112 such as that previously described in connection with FIG. 6 to produce, in conjunction with the CLOCK SIGNAL, the "0-3" control signals. In this connection, the audio program selector switch 102 of FIG. 8 may include a switching matrix such as that shown in FIG. 6 to reverse the encoding process in response to the "0-3" control signals and thus provide the information signals, SIGNAL A-SIGNAL D. A selector switch 114 may be turned by the subscriber to provide signals A, B, C or D and thereby conventionally select the desired one of the audio information signals at the output of the switch 102 of FIG. 8. The A, B, C and D signals may be sampled at the switch 114 to provide the STV select signal STV and STV or a separate subscriber switch may be provided for this purpose.

It will be appreciated that the provision of four audio signals in addition to a normal audio signal is accomplished within the normal television audio signal band and the overall television band allocated to a single television channel and therefore provides numerous advantages both in normal, non-subscription television systems and in subscription systems. In a non-subscription system, a television program can be transmitted with the normal audio signal containing the English language program soundtrack while the additional audio signals may contain a Spanish language soundtrack, a French language soundtrack and/or other languages from which the viewer can choose. In an area with a mix of English speaking and Spanish speaking residents such as Los Angeles, the normal audio signal can transmit one language while one additional audio signal simultaneously provides another. If, in addition, there is a large Japanese population, this language may be provided in yet another of the additional audio signals. Simultaneously, the remaining audio signals may contain captioning information to drive a character generator and provide captions for insertion into the video, and/or information for other services such as a facsimile service, a news or stock exchange service (e.g., in conjunction with a printer driven by the information signals in the received additional audio signals, etc.

These latter type of services are likely to be subscription services paid for on a periodic basis or on the basis of use. For subscription services, it may be desireable to scramble the additional audio signals so that only eligible subscribers can use the transmitted information even though the accompanying video signal may not be scrambled. In other words, a subscription service may include just the additional audio signals and the basic television service over that channel (i.e. normal audio and video) may remain unchanged.

In, such a subscription system, each use of an additional audio signal may be recorded for billing purposes. The billing information may then be collected on a monthly basis. At this same time, the codes necessary for unscrambling the audio signals may be changed after it has been confirmed that the subscriber is still eligible to receive the subscription audio programs and/or services.

In accordance with another aspect of the present invention, a flat monthly rate may be charged for programs and services, but different types of programs and services are priced at different levels and the subscriber then pays in accordance with the types of programs and/or services to which he subscribes.

As is shown in U.S. patent application Ser. No. 920,846 of Robert S. Block et al assigned to the assignee of the present invention (the disclosure of which is hereby incorporated herein by reference), program identifying signals may be transmitted with the program signals and only those program signals that have certain identifying codes for which the subscriber has corresponding codes can be used at the subscriber station. In the Block et al system, the program identifying signals in the program information signals are detected and compared with signals that are locally generated by the subscriber's "category selector". Thus, a subscriber with a category selector that includes codes for all categories of programs can receive and unscramble all of the programs transmitted. However, a lock-out feature provides the subscriber with the capability to prevent unauthorized unscrambling of certain categories of programs.

Similarly, in accordance with one aspect of this invention, program identifying codes may be transmitted with the program signals (i.e., with the television programs including audio and video or just the special audio services). These transmitted codes are detected at the subscriber location and compared with locally generated signals in order to determine whether or not a subscriber is eligible to unscramble that particular program. As in the Block et al patent application, these program identifying signals may be different for each program and thus identify each program individually (so that they may also be used for billing, for example) or may be different only for different categories of programs. Alternatively, the category code comparator may be set to accept a plurality of different program codes as falling into one category of viewer eligibility. The category approach to coding or comparison is preferred for the sake of simplicity in a flat fee billing system of the type contemplated but either approach may be used. Moreover, it should be understood that the program identifying signals may also serve as the codes used for scrambling and unscrambling the program signals. Thus, for example, by using different identifying codes for different program categories and providing the subscriber with only those identifying codes selected in advance of a viewing period, the subscriber is limited to viewing and/or using only those categories of program or audio services with the pre-selected identifying codes.

As was mentioned above, the identifying codes are provided to the subscriber decoders in accordance with one embodiment of the invention by separately addressing the decoders and loading these codes through transmission of a decoder address for each subscriber followed by the codes of the categories of program that subscriber is eligible to use.

Figure 10:
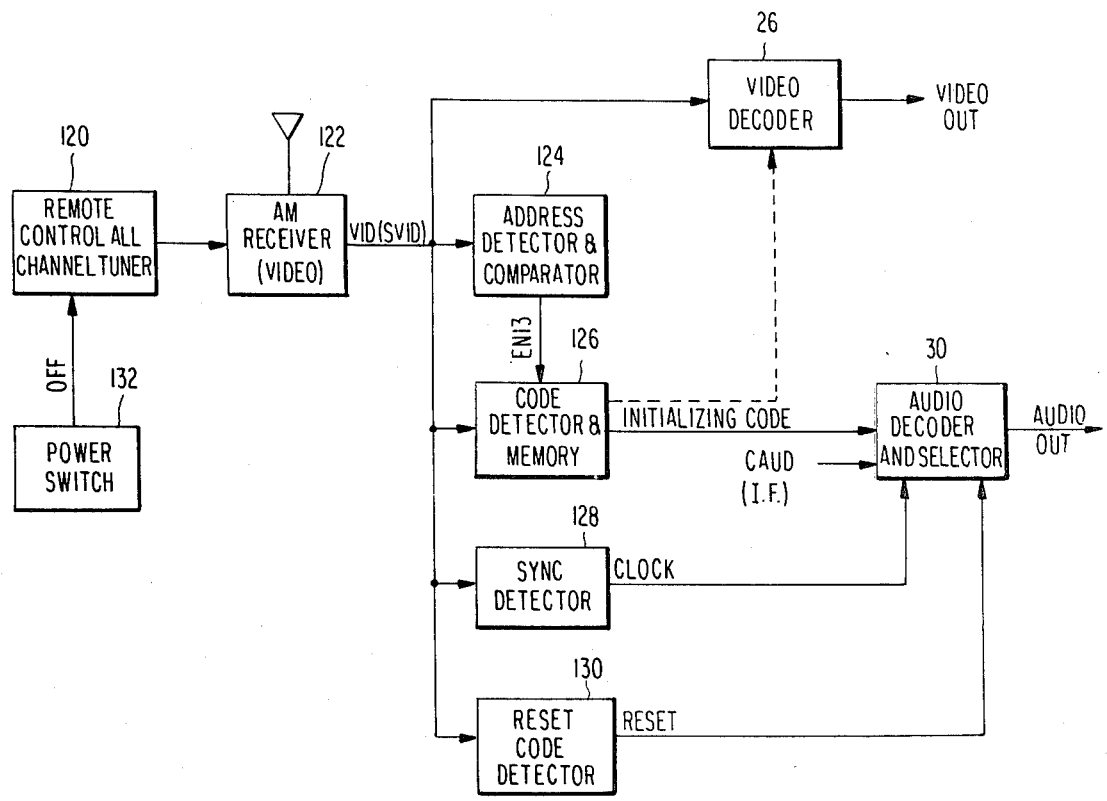

As is shown in FIG. 10, assuming that the address and eligibility codes are transmitted as part of the video signal (e.g. in the vertical interval), a remote control, all channel tuner 120, preferably of a conventional electronic type, controls the channel turning of the AM receiver 122 of the AM and FM receivers 16 of FIG. 1. The unscrambled or scrambled video signal VID (SVID) from the receiver 122 is applied to an address detector and comparator 124 and to a code detector and memory 126. The address detector and comparator detects addresses in the incoming video signal and compares the detected addresses with a stored address assigned to that subscriber decoder. When a successful comparison is made, the address detector and comparator 124 enables the code detector and memory 126, and subsequent codes in the video signal are detected and stored in memory for use by the video and/or audio decoders 26 and 30.

In the illustrated embodiment, the CLOCK and RESET signal used for the audio decoder and selector 30 are also transmitted as part of the video signal. For example, the CLOCK signal may be the vertical or horizontal sync pulse or a coded periodic signal transmitted in the vertical retrace interval. Similarly, the RESET signal may be a particular sync pulse or a special code transmitted in the vertical retrace interval. Accordingly, the video signal VID (SVID) is also applied to a sync or code detector 128 to generate the CLOCK signal and to a reset code detector 130 to detect the RESET signal. This video signal is also applied to the video 26, as shown in FIG. 1, which unscrambles the SVID signal in a scrambled video system.

It should be noted that it will probably be necessary to demodulate (detect) the video signal in order to produce baseband video if the address and codes are transmitted therein. Accordingly, a separate video detector (not shown) may be used ahead of the address detector and comparator 124 and the other code detectors 126, 128, and 130. It may, however, be necessary to obtain the baseband video for the purpose of unscrambling the video (e.g., where video inversion is used for scrambling or where it is necessary to reconstitute the sync to provide a proper video signal to the TV set). Accordingly, a more practical approach may be to use the baseband video signal from the video decoder 26 for application to the address and code detectors 124, 126, 128 and 130 rather than the VID (SVID) signal as shown.

With continued reference to FIG. 10, the power switch 132 on the subscriber decoder is connected so that power is continuously supplied to the circuits 120-130 (and the video decoder 26 if it provides the baseband video signal to the detectors 124-130). The power switch 132 also supplies an OFF signal to the tuner 120 in order to provide an indication of when the subscriber tuner is turned off. This OFF signal controls the tuner in a conventional manner so that the tuner is set at a predetermined television channel setting (e.g. channel 3) whenever the power switch is off.

It is contemplated that the categories of programs to which a subscriber indicates a desired to subscribe will be stored in that subscriber's decoder either at initial installation or by addressing the decoder after installation. However, the subscriber may wish to add or delete categories after a period of use. Accordingly, shortly after installation and/or at other times prior to the beginning of a new viewing period when a subscriber has indicated a desire to change category eligibility, an address code for that subscriber's decoder is transmitted as part of the video signal. The address code in the video signal is detected and compared with a stored address by the address detector and comparator 124. If the addresses match (preferably within certain tolerances) the code detector and memory 126 is enabled by the ENB signal and category codes following the address code are detected and stored in memory by the code detector and memory 126. These stored category codes permit the subscriber's decoder to successfully unscramble and use scrambled signals in one category but not in another category. For example, the category codes may be in the form of initializing codes for the audio decoder and selector 30 and/or unscrambling codes for the video decoder 26. Alternatively, the initializing codes and unscrambling codes for the audio and video decoders may be provided in another manner so that they may be changed more frequently than the category codes. Of course, if the category codes for the various categories are changed on a periodic basis, this security concern is alleviated. If this latter approach is taken, for example, the category codes stored by the circuit 126 may be compared with category codes in the received signal to either enable or inhibit unscrambling of that signal.

It will be appreciated that the scrambling and I/Q transmission technique set forth herein may be applied to the secure transmission of signals other than video. For example, video signal transmission via satellite may employ in-phase and quadrature components of a carrier signal and alternate modulation of those components with two different video signals for secure satellite transmission. Moreover, it will be appreciated that the scrambling codes for video and/or audio information may be produced and transmitted in a variety of ways.

For example, the PRBS generator at the transmitting location may be free-running and its present state may be transmitted periodically so that the PRBS generator at the receiver can be synchronized with that at the transmitter. Also, the PRBS codes may be provided in a number of ways including by transmission in the video signal as discussed, or in the audio signal.

From the foregoing description, it will be made clear that the present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A method for secure transmission of plural audio signals, comprising the steps of:
providing at least two different audio signals;
transmitting in a first form within a predetermined frequency band one and then the other of the audio signals in a sequence of time intervals such that parts but not all of each of the two audio signals are transmitted in said frequency band in the first form;
transmitting within said frequency band, in a second form distinguishable from said first form, one and then the other of the audio signals in said sequence of time intervals such that the one of the audio signals is transmitted in a time interval in the second form while the other is being transmitted in a time interval of corresponding length in the first form and vice-versa, parts of the one and the other audio signals not transmitted in the first form thereby being transmitted in the second form so that the two audio signals are transmitted in their entireties in said frequency band but are transmitted in part in the first form and in part in the second form, both of the two audio signals being available in the transmitted signal for selection in their entireties from said first and second forms.

2. The method of claim 1 wherein said time intervals in said sequence vary in duration in a determinable manner.

3. The method of claim 1 including the steps of providing a third audio signal, and transmitting said third audio signal within said frequency band in a third form distinguishable from said first and second forms, said third audio signal being available for selection in its entirety in said third form.

4. The method of claim 1 or 3 wherein said first and second forms comprise different subcarriers within said frequency band.

5. The method of claim 1 or 3 wherein said first and second forms comprise respective in-phase and quadrature components of a subcarrier within said frequency band.

6. The method of claim 1 including the further steps of transmitting data related to the sequence of time intervals, and selecting at least one of the two transmitted audio signals in its entirety for production of sound in response to said transmitted data.

7. The method of claim 6 wherein said time intervals in said sequence vary in duration in a pseudo-random manner and wherein said data is indicative of said pseudo-random manner.

8. The method of claim 3 including the step of selecting at least one of the first, second and third transmitted audio signals in its entirety for production of sound.

9. A secure audio signal transmission system comprising:
   first and second sources for at least two different audio signals;
   means for transmitting in a first form within a predetermined frequency band one and then the other of the audio signals in a sequence of time intervals such that parts but not all of each of the two audio signals are transmitted in the frequency band in the first form, said transmitting means including means for transmitting within said frequency band, in a second form distinguishable from said first form, one and then the other of the audio signals in said sequence of time intervals such that the one of the audio signals is transmitted in a time interval in the second form while the other is being transmitted in a time interval of corresponding length in the first form and vice-versa, parts of the one and the other audio signals not transmitted in the first form thereby being transmitted in the second form so that the two audio signals are transmitted in their entireties in said frequency band but are transmitted in part in the first form and in part in the second form, both of the two audio signals being available in the transmitted signal from said transmitting means for selection in their entireties from said first and second forms.

10. The system of claim 9 wherein said transmitting means comprises:
    means for generating in-phase and quadrature components of a first carrier signal;
    means for modulating said in-phase component with said one and the other of said audio signals to produce said first form; and,
    means for modulating said quadrature component with said one and the other of said audio signals to produce said second form distinguishable from said first form.

11. The system of claim 10 including:
    means for combining the modulated in-phase and quadrature components of said first carrier signal; and,
    means for modulating a second carrier signal with the combined components from said combining means.

12. The system of claim 9, 10 or 11 including means for generating said sequence of time intervals such that said time intervals vary in duration in a pseudo-random manner.

13. A method for transmitting and receiving information in a communications medium comprising the steps of:
    providing an audio signal and a plurality of information signals, the information signals each being limited in frequency to a predetermined audio frequency range;
    generating a plurality of distinctive carrier signals within a predetermined frequency band allocated for transmission of audio in a single channel within said medium;
    modulating a first one of the plurality of carrier signals with at least one of the plurality of information signals;
    modulating a second of the plurality of carrier signals with at least another of the plurality of information signals;
    combining the audio program signal and the modulated first and second carrier signals to form a composite baseband audio signal;
    transmitting the composite baseband audio signal at a carrier frequency within the audio frequency band allocated to said channel;
    detecting the composite baseband audio signal in the transmitted signal; and
    selecting any of the audio signal and the plurality of information signals from the detected composite baseband audio signal as a useable output signal.

14. The method of claim 13 wherein the first and second carrier signals are in-phase and quadrature components, respectively, of a single carrier wave.

15. The method of claim 13 wherein the first and second carrier signals are distinct signals displaced in frequency from the audio signal and each other, within the composite audio baseband, by an amount at least greater than said predetermined audio frequency range.

16. The method of claim 13, 14 or 15 including the steps of encoding the plurality of information signals prior to modulating the carrier signals therewith, and decoding the encoded information signals detected in the composite baseband audio signal prior to the step of selecting.

17. Apparatus for transmitting and receiving information in a communications system comprising:

means for providing an audio signal and a plurality of information signals, the information signals each being limited in frequency to a predetermined audio frequency range;

means for generating a plurality of distinctive carrier signals within a predetermined frequency band allocated for transmission of audio in a single channel within the communications system;

means for modulating a first and a second of the plurality of carrier signals with at least one and another, respectively, of the plurality of information signals;

means for combining the audio signal and the modulated first and second carrier signals to form a composite baseband audio signal;

means for transmitting the composite baseband audio signal at a carrier frequency within the audio frequency bands allocated to said channel; and means remote from the transmitting means for detecting the composite baseband audio signal in the transmitted signal and selecting any of the audio signal and the plurality of information signals from the detected composite baseband audio signal as a useable output signal.

18. The apparatus of claim 17 wherein the first and second carrier signals are in-phase and quadrature components, respectively, of a single carrier wave.

19. The apparatus of claim 17 wherein the first and second carrier signals are distinct signals displaced in frequency from the audio signal and each other, within the composite audio baseband, by an amount at least greater than said predtermined audio frequency range.

20. The apparatus of claim 17, 18 or 19 including means for encoding the plurality of information signals prior to modulating the carrier signals therewith, and wherein said detecting means includes means for decoding the encoded information signals detected in the composite baseband audio signal prior to selecting said any of the audio program signal and the plurality of information signals.

* * * * *